Feb. 20, 1962 T. W. MILTON ETAL 3,021,756
REAR VISION MIRRORS
Filed June 1, 1956 2 Sheets-Sheet 1
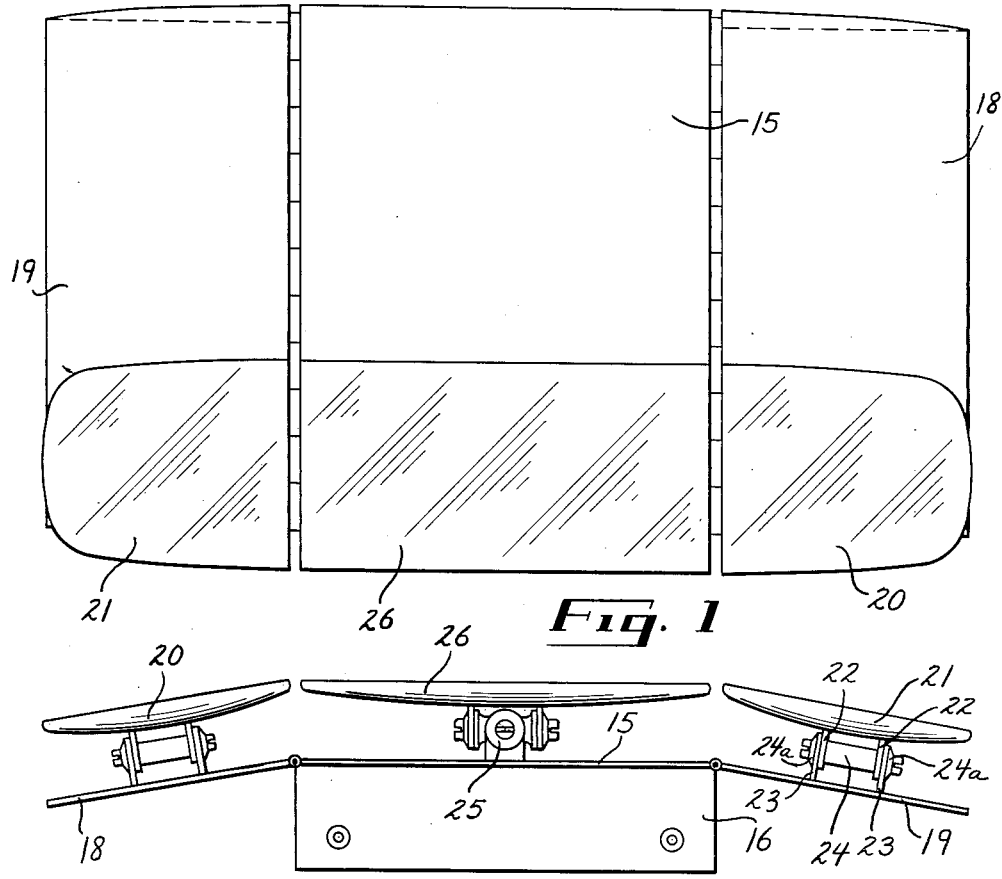
Fig. 1
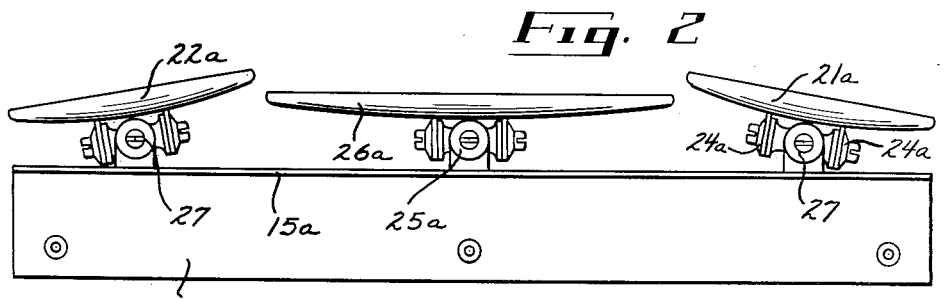
Fig. 2
Fig. 3
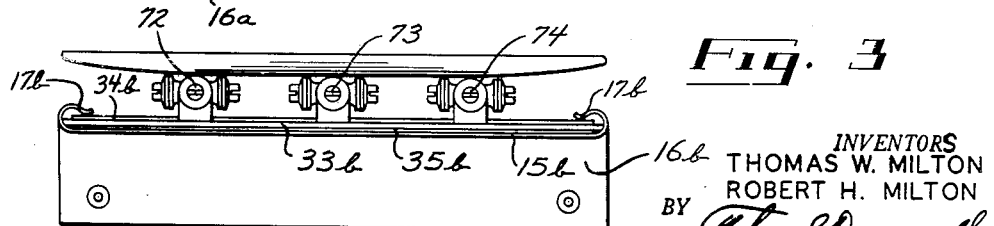
Fig. 9
INVENTORS
THOMAS W. MILTON
ROBERT H. MILTON
BY Thos. L. Donnelly
Attorney

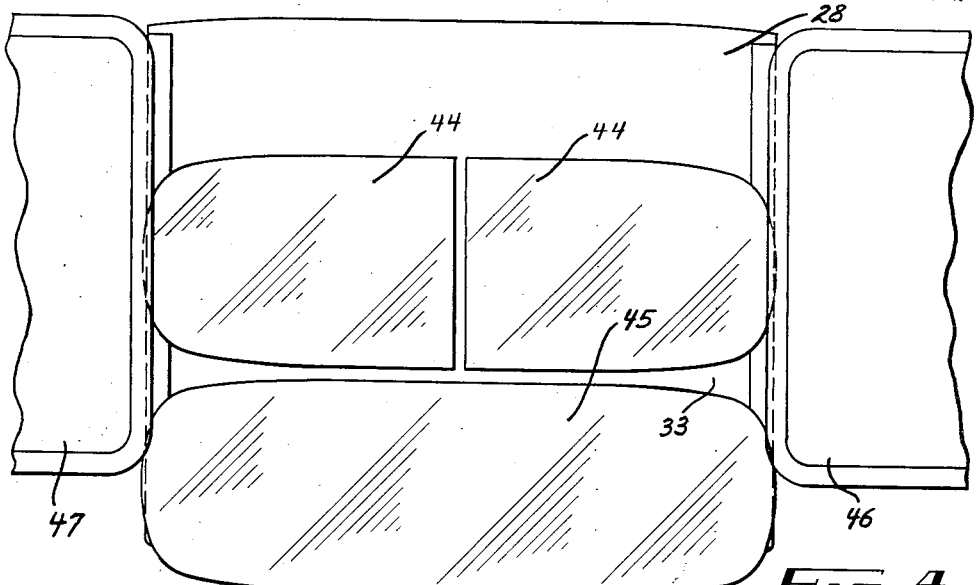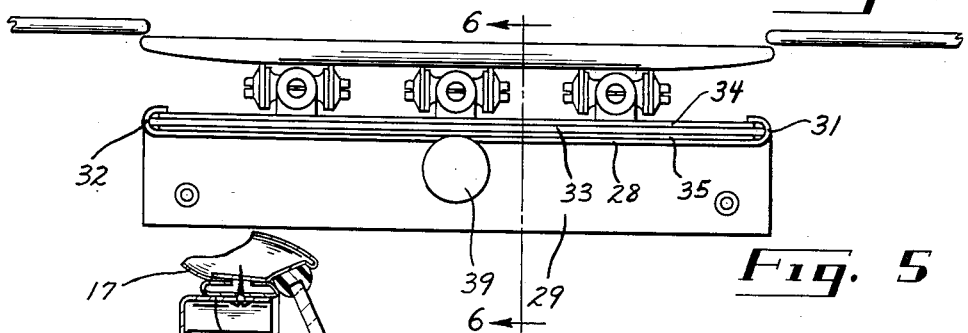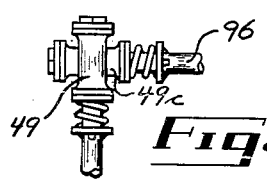

3,021,756
REAR VISION MIRRORS
Thomas W. Milton and Robert H. Milton, both of
8619 Mack, Detroit, Mich.
Filed June 1, 1956, Ser. No. 588,839
1 Claim. (Cl. 88—86)

Our invention relates to a new and useful improvement in rear vision mirrors for use on vehicles whereby the driver of the vehicle may have a view of the highway or street behind the vehicle being driven, and also a view of the highway or street at the right and left rear which is not visible in the usual single plane mirror.

At the present time, the rear view mirror is mounted on the windshield moulding by a suitable support which projects downwardly a distance and carries at its lower end the rear view mirror. This is mounted substantially centrally of the frame of the windshield and at opposite sides thereof are mounted swingable wings which are termed sun visors but which, of course, do not meet at their adjacent ends when swung into operative position. This leaves the center portion of the windshield unprotected against the glare of the sun excepting at that space which may be occupied by the rear vision mirror.

Experience has shown that when driving into the rays of the sun, as for example, when the sun has risen and has risen only a certain amount, or when the sun is setting and has set only a certain amount, it is impossible to use the conventional rear view mirror which is then in the line of the sun's rays. Accordingly, it is an object of the present invention to provide a rear vision mirror and mounting for the same whereby this hazard will be eliminated.

It is another object of the present invention to provide a rear vision mirror and mounting for the same whereby the center part of the windshield will be shielded off against the rays of the sun so that the operator of the vehicle will at all times be able to view objects in the rear vision mirror, regardless of the direction of the sun's rays.

Another object of the invention is the provision of a rear vision mirror associated with side mirrors so that the operator may have a view to the rear of the vehicle on opposite sides of the vehicle and centrally thereof regardless of whether the vehicle is being driven into the rays of the sun or not.

Other objects will appear hereinafter.

It is recognized that various modifications and changes may be made in the details of the structure illustrated without departing from the invention, and, it is intended that the present disclosure shall be considered to be but the preferred embodiment.

Forming a part of this application are drawings, in which:

FIG. 1 is an elevational view of the invention;

FIG. 2 is a top plan view of the invention;

FIG. 3 is a top plan view of the invention showing a slight modification of the combined sun visors and mirrors;

FIG. 4 is a front elevational view of the invention showing it mounted and in slightly modified form;

FIG. 5 is a bottom plan view of the structure shown in FIG. 4;

FIG. 6 is a transverse sectional view of the structure shown in FIG. 5 taken on substantially line 6—6 of FIG. 5;

FIG. 7 is a side elevational view of a pivot used in the invention;

FIG. 8 is a fragmentary elevational view of a modified form of the pivot construction;

FIG. 9 is a top elevational view of a further modified form of the structure.

In FIG. 1 we have shown an opaque plate 15 having at its top an outwardly or inwardly extending fastening flange 16 which may be attached by screws or in any other suitable manner to the upper interior moulding 17 (FIG. 6) of the windshield of a vehicle adjacent the center portion of the windshield. Swingably attached to opposite sides of this plate 15 are opaque plates 18 and 19, each of which carries at its bottom a mirror 20 and 21 respectively. Plates 15, 18 and 19 form an opaque supporting body. The mirrors 20 and 21 are secured to the swingable plates 18 and 19 by means of lugs 22 cooperating with lugs 23, and between these lugs extends a spacer 24, which is threaded to receive securing screws 24a, so that the mirror may be rocked upwardly and downwardly on a horizontal axis.

In use these mirrors 20 and 21 would be rocked to the proper vertical position and the plates 18 and 19 would be swung to the proper horizontal position so that the driver of the vehicle would have a view in the mirrors 20 and 21 of the highway or street rearwardly and at opposite sides of the vehicle. These mirrors, therefore, would serve the function of the conventional side view mirrors which are now used on vehicles and mounted on the exterior thereof.

Mounted on the plate 15 adjacent the bottom thereof by means of a universal bracket 25, is a rear view mirror 26 which may be rocked upwardly or downwardly and also sideways. This rear view mirror would, of course, be adjusted to suit the convenience of the driver of the vehicle so that the rear view mirror 26 would afford a reflected view of the street or highway rearwardly of the vehicle and would function in the manner of the conventional rear view mirror customarily used on vehicles. However, due to the fact that the plates 15, 18, and 19 are opaque, the difficulty encountered in driving directly into the rays of the sun is avoided and no interference is encountered by the driver of the vehicle in viewing the objects in any of the mirrors.

In FIG. 3 we have indicated a plate 15a having an attachment flange 16a formed thereon. The swingable side flaps shown in FIG. 1 have been eliminated and the mirrors 21a and 22a are also mounted on a universal connection 27 so that these mirrors may be swung on a horizontal or vertical axis. The mirror 26a corresponds to the mirror 26 shown in FIG. 1 and the universal mounting 25a corresponds to the universal mounting 25 shown in FIG. 1.

In the form shown in FIGS. 4, 5 and 6, we have indicated a modification. In this modification we have used an opaque body or plate 28 having at its upper end the projecting flange 29 which may be attached to the upper moulding 17 of the windshield 30. At the opposite edges of the opaque plate 28 are formed channels 31 and 32 in which are slidably engaged an opaque attaching plate 33 covered by layers 34 and 35 of suitable upholstery. The plates 15, 18, 19 and 15a may also be covered by suitable layers of upholstery so that the appearance of the opaque plate would correspond to the interior finish or ornamentation of the vehicle.

The plate 33 shown in FIGS. 4, 5 and 6 is provided with a threaded nut 36 which projects through the slot 37 formed in the supporting plate 28 and the upholstery layer 35. Consequently, the plate 33 may be moved upwardly and downwardly in the channels 31 and 32. This is effected by the threaded stem 38 which carries the knob 39 and which is provided with a collar structure 40 cooperating with the lug 41, which projects rearwardly from the plate 28 so that the threaded stem 38 cannot be moved longitudinally of the structure.

Mounted on this plate 33 by the universal connections 42 and 43 are the side view mirrors 44 and the rear view mirror 45. These mirrors are universally adjustable either on a vertical or horizontal axis in order to obtain the desired angularity.

The purpose of this elevating mechanism is to simplify the adjustment of the mirrors for drivers of varying stature, for after the desired angular positions of the mirrors have been established, it is only necessary to adjust the elevation of the assembly by means of the knob 39.

The elevating knob and related parts may be eliminated by forming the channels 31 and 32 so as to provide suitable friction to maintain the sliding plate 33 in any adjusted position of elevation, as shown in FIG. 9.

The various advantages referred to as present in the structure as shown in FIG. 1 are also shown in the structure of FIG. 4 and FIG. 9. In FIG. 4, we have indicated the visors 46 and 47 swinging downwardly into operative position so as to indicate their relation to the mirror mounting.

In FIG. 7 we have shown one type of universal mounting 48, and in FIG. 8 we have shown another type 49. However, in the mounting of the mirror on their supports, any desired type of universal mounting may be used. In the form shown in FIG. 7, spring washers are utilized to create the required friction between the adjacent surfaces to maintain the mirrors in their adjusted positions, and in the structure shown in FIG. 8, the friction is adjustable by rotation of the rod 96 which is threaded and passes through the nut 49c.

In FIG. 9, we have shown a slight modification. In this modification, a flange 16b projects outwardly from a plate 15b. The edges of this plate are curved inwardly as at 17b to form a yieldable clamping structure clamping the upholstery 34b and 35b which covers the plate 33b. Mounted on this plate 33b by attachment screws 72, 73 and 74 are mirrors 75 and the equivalent of mirrors 44 in FIG. 4. The construction is such that the plate 33b may be slid upwardly and downwardly against the tension of the inturned ends 17b.

What we claim is:

In a vehicle having a windshield and an interior moulding mounted along the upper edge of said windshield, an opaque supporting body mounted on and depending from said interior moulding on said windshield adjacent the center thereof and blocking off the sun's rays through said center portion of the windshield; a channel formed along each of the vertical edges of said body; a mirror supporting member having its side edges slidably mounted in said channels; means for moving said mirror supporting member upwardly and downwardly in said channels; a plurality of rear vision mirrors mounted on said mirror supporting member; and, means for adjusting said mirrors on said mirror supporting member about horizontal and vertical axes.

References Cited in the file of this patent

UNITED STATES PATENTS

| | | |
|---|---|---|
| 1,518,956 | Beitman | Dec. 9, 1924 |
| 1,724,029 | La Hodny | Aug. 13, 1929 |
| 1,858,734 | Fotakis | May 17, 1932 |
| 1,864,015 | Fotakis | June 21, 1932 |
| 2,033,391 | Muench | Mar. 10, 1936 |
| 2,097,419 | Schmidt | Oct. 26, 1937 |
| 2,123,319 | Thompson | July 12, 1938 |
| 2,168,003 | Stone | Aug. 1, 1939 |
| 2,570,357 | Martin | Oct. 9, 1951 |
| 2,573,812 | Schroeder | Nov. 6, 1951 |
| 2,780,960 | Miller | Feb. 12, 1957 |

FOREIGN PATENTS

| | | |
|---|---|---|
| 649,008 | Great Britain | Jan. 17, 1951 |
| 1,059,898 | France | Nov. 18, 1953 |